Dec. 13, 1960  W. E. STILLINGS  2,964,690
SPEED CONTROL FOR AN ELECTRICAL MOTOR
Filed June 27, 1958  2 Sheets-Sheet 1

INVENTOR.
Warner E. Stillings by Ralph R Barnard
ATTORNEY

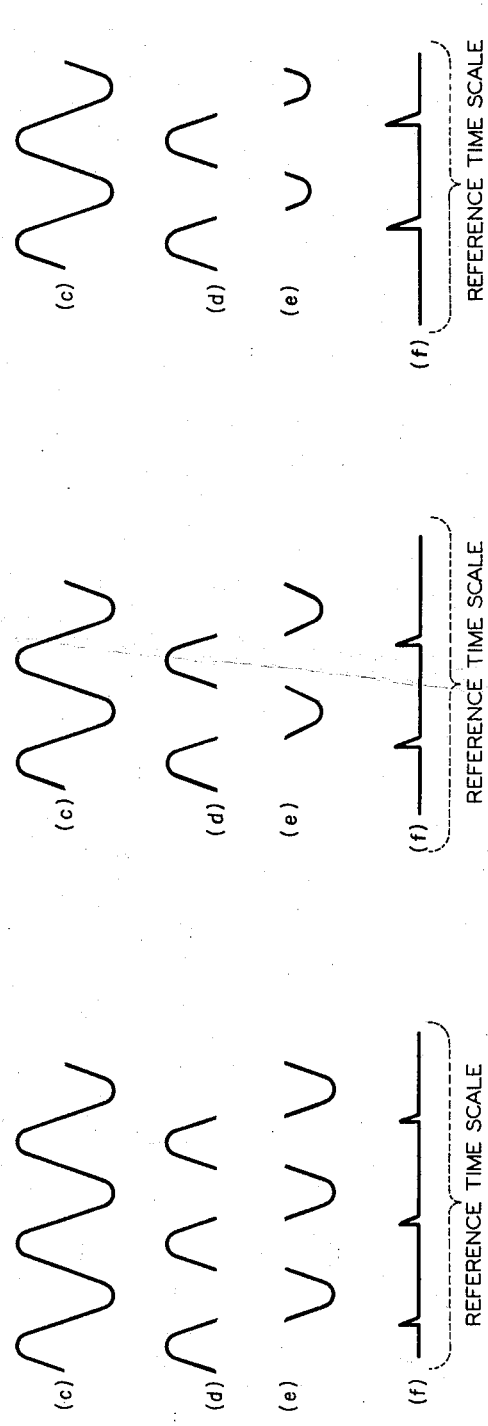
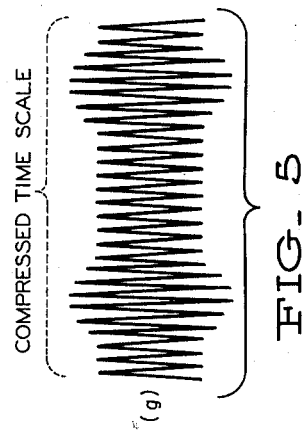
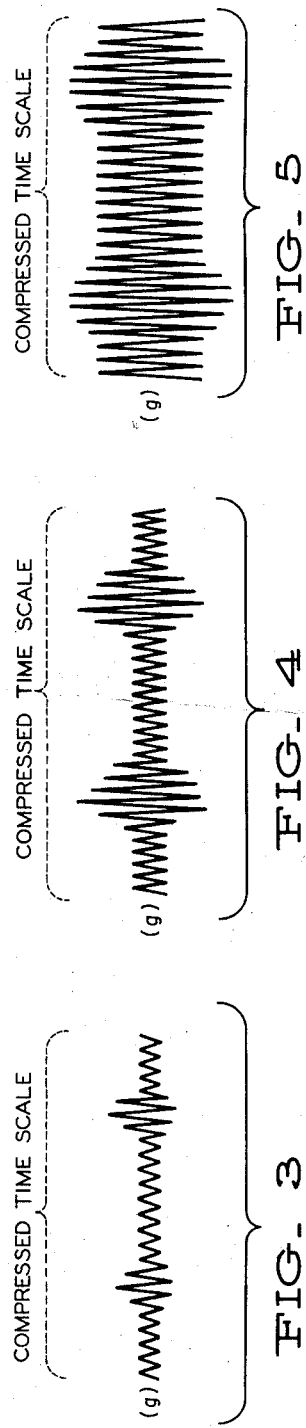

United States Patent Office 2,964,690
Patented Dec. 13, 1960

2,964,690

SPEED CONTROL FOR AN ELECTRICAL MOTOR

Warner E. Stillings, Binghamton, N.Y., assignor to International Business Machines Corporation, New York, N.Y., a corporation of New York Filed June 27, 1958, Ser. No. 745,182

11 Claims. (Cl. 318—228)

The present invention relates to improvements in electrical control circuitry and more particularly to a new and improved speed control for electrical motors.

In many computer applications it is desired to position shafts, dials, counters, etc. in an accurate manner with a wide range of speeds including a very slow speed. Specifically, a very wide range of set motor speeds is required to allow for high speed slewing in combination with means for making very slow speed adjustments of a given setting or position.

As is well known in the electrical arts, whenever it is desired to drive a load over a wide range of speeds, it has been the practice to use direct current voltage motors because of the simplicity of the speed control required. Direct current electrical motors have been particularly desirable as the only practical method for providing a slow or creep speed output. However, direct current electrical motors have a disadvantage which is often critical in that their physical size is usually much in excess of an alternating current electrical motor of equivalent power output. On the other hand, alternating current electrical motors as a broad class operate in a manner such that the frequency of the alternating current voltage supply determines the speed at which the motor operates. For this reason, the speed of alternating current electrical motors has been often controlled in the past by controlling the frequency of the voltage supply. In addition to being ineffective for the control of a slow speed operation, this method has proven to be complex in terms of the equipment required.

Another way of controlling the speed of alternating current electrical motors of the induction type has been either to vary the magnitude of the applied voltage or, alternatively, to vary the phase displacement of the voltage between plural windings which, in turn, lowers the effective voltage being applied to the motor. This method has the serious disadvantage that the voltage required to provide the starting torque is higher than that required to maintain the alternating current motor above the stalling point of the motor. As a result, the variation of the magnitude of the effective input voltage has not been particularly accurate or effective when very slow speed positioning of the load is desired. In summary, wide ranges of speed control alternating current electrical motors have never been completely satisfactory because of the problems arising in attempting to control this input voltage to obtain the very slow or creeping speed of operation.

In the past there have been many occasions where it would have been desirable to use alternating current electrical motors because small dimensions and low weight were of critical importance; however, direct current motors had to be used because speed control was also an important requirement. On the other hand, occasionally it was desired to control a direct current motor at a very low or creeping speed with a degree of preciseness which is not available by using known direct current speed control techniques. The present invention is concerned with a means for providing speed control for alternating current motors over a wide speed range including a very slow or creeping speed and a speed control for direct current motors limited to low or creeping speeds.

It is, therefore, a primary object of the present invention to provide a new and improved speed control system for electrical motors.

It is another object of the present invention to provide a new and improved saturable core reactor speed control system for electrical motors.

It is still another object of the present invention to provide a new and improved saturable core reactor speed control system for electrical motors where the voltage applied comprises an alternating current carrier voltage level with an electrical control pulse superimposed thereon that is effective to energize the electrical motor for a very slow speed operation.

It is an additional object of the present invention to provide a new and improved saturable core reactor speed control system for an alternating current electrical motor for wide ranges of speeds including a very slow or creep speed for accurately positioning its load.

Other objects of the invention will be pointed out in the following description and claims and illustrated in the accompanying drawings which disclose, by way of examples, the principle of the invention and the best mode which has been contemplated of applying that principle.

In the drawings:

Figs. 3, 4 and 5 show exemplary electrical waveforms helpful in understanding the operation of the embodiment of Fig. 1 when its saturable core reactor is in its maximum bias, medium bias and minimum bias conditions, respectively.

Briefly, the present invention may be described as residing in energizing an alternating current electrical motor from an alternating current voltage source and a control pulse source having a pulse width equal to a substantial number of cycles of the alternating current voltage source through a saturable core reactor having a biasing means. As a result of the application of these combined voltage sources through the saturable core reactor, the alternating current electrical motor is effectively energized with an alternating current carrier voltage having control pulses superimposed thereon. The magnitude of these pulses is commensurate with the amplitude of the control pulse from the pulse source and the biasing provided by the biasing means. These superimposed pulses are effective to energize the alternating current motor for a slow speed operation even though the alternating current carrier voltage is below that which would overcome the starting or stalling torque of that motor. The speed of operation of the alternating current electrical motor is then a function of the repetition rate, width and effective amplitude of the superimposed pulses.

Figure 1:
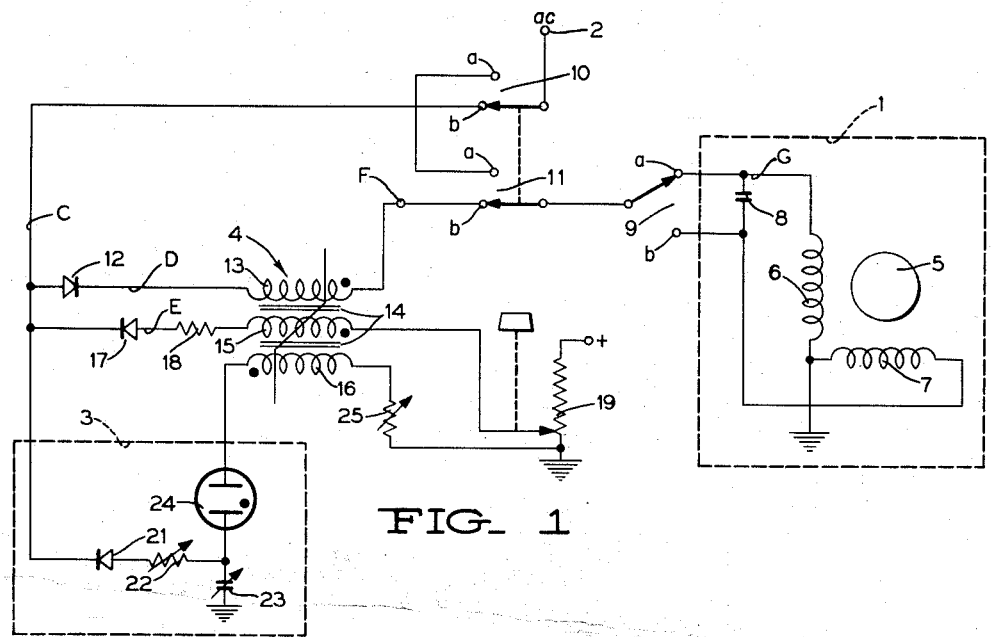
Fig. 1 shows an electrical schematic of the disclosed embodiment of the present invention.

Referring now to Fig. 1, there is shown an alternating current electrical motor 1 which, by way of example, may be of the two phase type comprising a conventional rotor assembly 5 with two stator windings 6 and 7 oriented at 90° from one another. One terminal of each of stator windings 6 and 7 may be grounded, as shown, while the other terminal of each is connected to the other by exemplary electrical phase shifting means shown herein as a capacitor 8. Thus, if stator winding 6 is energized by an alternating current voltage source, that winding will receive a voltage which is in phase with the alternating current voltage source; whereas, the other winding 7 receives an alternating current voltage which is phase shifted by substantially 90° with respect to the alternating current voltage source. Accordingly, these two stator windings, 6 and 7, provide a rotating electromagnetic field which in turn rotates the rotor 5 at a rotational speed in accordance with the magnitude of the applied voltage and its frequency. As is well known to those skilled in the art, the frequency of the applied voltage will determine the maximum speed of the motor. Conventionally, if it is desired to reverse the direction of rotation of rotor 5, the alternating current voltage source is applied through stator winding 7 with stator winding 6 being energized through capacitor 8. Switch 9 provides such a reversing function, as shown.

As set forth hereinabove, it is often desirable to energize an alternating current electrical induction motor, exemplified by motor 1, for operation over a wide range of rotational speeds. As further indicated, it has been the practice in the prior art to provide this rotational speed variation by varying the magnitude of the voltage applied to the stator windings. While such a technique was satisfactory for high rotational speeds, it is very unsatisfactory when it is desired that the motor 1 be rotated at a very slow or creeping speed, which would be desirable in setting dials and counters in accurate rotational positions for electrical computer applications. As suggested above, it is the purpose of the present invention to provide a saturable core reactor that will energize motor 1 or any of its many equivalents for a slow or creeping speed of operation hereinafter referred to as the slow speed mode of control.

In addition, it is often desired to provide a high speed operation for the same motor 1 for high speed slewing from one extreme dial, counter, etc. setting to another. This will be referred to hereinafter as the high speed mode of control for motor 1. Gang switches 10 and 11 are shown as providing a means for making the desired selection of modes. For example, when mechanically ganged switches 10 and 11 are switched from the position shown in Fig. 1 to their other position, switch contacts 10a and 11a connect an alternating current voltage source 2 directly to stator windings 6 and 7 of motor 1 through reversing switch 9. As a result, a maximum voltage is applied to stator windings 6 and 7, and rotor 5 of motor 1 rotates at its maximum speed in a direction determined by the condition of reversing switch 9.

When it is desired that motor 1 be operated in its slow speed mode, the mechanical ganged switches 10 and 11 are switched to the position shown in Fig. 1, thereby closing switch contacts 10b and 11b such that motor 1 is energized by the positive half cycles only of the alternating current voltage source 2 through forwardly oriented diode 12, gate winding 13 of saturable reactor 4, and reversing switch 9. The plate of diode 12 is connected to source 2, while its cathode is connected to gate winding 13. In addition to gate winding 13, saturable core reactor 4 is shown as consisting of a saturable core 14 on which gate winding 13 is wound, a biasing winding 15 wound on core 14 in the same sense as gate winding 13, and a control winding 16 wound on core 14 in an opposite sense with respect to gate winding 13 and biasing winding 14. Biasing winding 15 is energized by the negative half cycles of alternating current voltage source 2 via reversely oriented diode 17 and a biasing resistor 18. A variable resistance 19 is connected between the other terminal of biasing winding 15 and ground in order that the biasing level may be changed as desired. Resistor 18 may be selected to provide a maximum bias for biasing winding 15 with the movable wiper of variable resistor 19 being positioned to the ground voltage level. As will be explained in more detail hereinafter, the positive half cycles being applied to gate winding 13 of saturable reactor 4 drive the saturable core toward saturation in a positive direction, and the negative half cycles being applied to biasing winding 15 drive the saturable core toward saturation in the negative direction.

Figure 2:
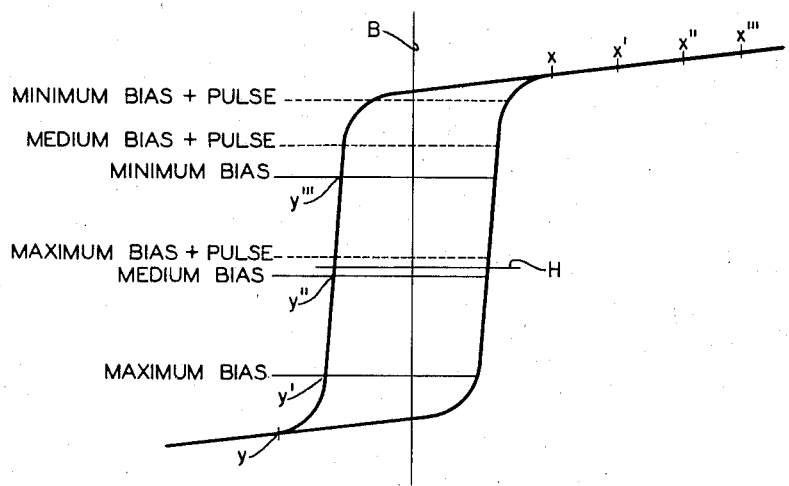
Fig. 2 shows an exemplary hysteresis loop for the saturable core of Fig. 1 which will be helpful in understanding the operation of the present invention.

Fig. 2 shows a typical hysteresis loop for the saturable core 14 of Fig. 1 and represents a plot of the instantaneous flux density B on the ordinate versus the instantaneous magnetomotive force H necessary to derive the corresponding flux density B on the abscissa. Because of the well known phenomenon of magnetic hysteresis, this relationship is non-linear and energy consuming with the positive going and negative going changes in flux density characteristically following different paths, thereby forming a loop. In Fig. 2, point X represents the positive saturation condition where a further increase of magnetomotive force H will not result in any substantial increase in the flux density in the positive direction, while point Y represents the negative saturation condition where a further negative increase in magnetomotive force H will not result in any substantial increase in flux density in the negative direction. Disregarding the effect of control winding 16 and assuming an initial magnetic condition for saturable core 14 of point Y, a proper selection of the magnitude of the alternating current voltage source 2 may be made such that when the positive half cycle is applied to gating winding 13, it will produce a magnetomotive force H, which will tend to drive the flux density B in a positive direction from point Y to point X. The negative half cycle being applied to biasing winding 15 will produce a magnetomotive force H, which will tend to drive the flux density B in a negative direction from point X to point Y.

The flux density B will cyclically vary between points Y and X along two distinct paths in synchronism with the frequency of the alternating voltage source 2 only as long as the electrical paths through gating winding 13 and biasing winding 15 are of equal effectiveness. When, as shown in Fig. 1, biasing resistor 18 is inserted in series with biasing winding 15, the maximum negative magnetomotive force available is decreased and the lower maximum negative flux density is shifted to point Y', as shown in Fig. 2. Because the magnitude of the positive half cycle of the voltage being applied to gating winding 13 is unchanged, the flux density B will then vary between point Y' and a new point X' along the two distinct paths, shown in Fig. 2, in synchronism with the frequency of the source 2.

Moreover, if additional resistance is placed in series with the biasing winding 15 by an adjustment of variable resistor 19 providing what might be described as medium biasing, the maximum negative magnetomotive force available is further decreased, and the lower maximum flux density is shifted to Y''. Because the magnitude of the positive half cycle of the voltage being applied to the gate winding 13 is unchanged, the flux density B will cyclically vary between points Y'' and a new point X'' along the two distinct paths in synchronism with the frequency of the source 2.

Moreover, if more resistance is placed in series with biasing winding 15 by an adjustment of variable resistor 19 providing what might be described as minimum biasing, the maximum negative magnetomotive force available is further decreased, and the lower maximum negative flux density is shifted to point Y'''. Because the magnitude of the positive half cycle voltage being applied to gating winding 13 is unaltered, the flux density B will then cyclically vary between points Y''' and a new point X''' along two distinct paths in synchronism with the frequency of the alternating current voltage source 2. As shown in Fig. 2, the maximum positive magnetomotive force available is increased for each modification of the bias. However, as shown by points X'' and X''', each increase in positive magnetomotive force does not result in additional increases in the maximum positive flux density because of the saturation condition existing in the saturable core 14.

Those skilled in the art will recognize that when the flux density of saturable core 14 cyclically varies between points X″ and Y‴, gating winding 13 will exhibit less reactive impedance to the alternating current voltage source 2 than when the flux density varies between points Y′ and X′. This is based on the fundamental concept that the magnitude of the inductive reactive impedance of a winding is dependent on the magnitude of the flux change. It will be apparent that the flux change between points Y′ and X′ will be greater than the flux change between point Y″ and point X″. Stated another way, it may be said that gating winding 13 will exhibit an inductive reactive impedance until the saturable core 14 is driven into saturation. Likewise, gating winding 13 will exhibit more reactive impedance to the source 2 when the flux density of saturable core 14 cyclically varies between points Y″ and X″ than between points Y‴ and X‴.

Referring to Figs. 3, 4 and 5, there is shown in each waveform $c$ of the alternating current voltage source 2 appearing at point C in Fig. 1, waveform $d$ of the positive half cycle voltage being applied to gating winding 13 at point D in Fig. 1, waveform $e$ of the negative half cycle voltage being applied to biasing winding 15 at point E, waveform $f$ of the output voltage from gating winding 13 at point F in Fig. 1 (without regard for the effect of the control winding 16), and waveform $g$ of the effective voltage being applied to the alternating current motor 1 at point G. The input of motor 1 acts as a tuned circuit which passes a high frequency component of the pulse input waveform. It should be noted that waveform $g$ utilizes a compressed time scale compared to the output voltage waveform $f$ from gating winding 13. In addition, waveform $g$ illustrates the effect of control winding 16 on the gating winding 13 voltage output waveform from saturable reactor 4. As described hereinabove, Figs. 3(c), 3(d), 3(e), 3(f) and 3(g) represent the waveforms of interest for a maximum bias condition for biasing winding 15, while Figs. 4(c), 4(d), 4(e), 4(f) and 4(g) represent the waveforms of interest for a medium bias condition for biasing winding 15. Likewise, Figs. 5(c), 5(d), 5(e), 5(f) and 5(g) represent the waveforms of interest for a minimum bias condition for biasing winding 15.

As has been described, saturable core 14 will cyclically vary between points Y′ and X′ for a maximum bias condition in the bias winding 15. Thus, the voltage waveform shown in Fig. 3(d) will drive the flux density from point Y′ to point X′, while the voltage waveform of Fig. 3(e) will drive the flux density from point X′ to point Y′ over different paths. As a result of the saturation condition existing between points X and X′, the reactive impedance of gating winding 13 goes to zero during the time corresponding to that portion of the positive half cycle waveform shown in Fig. 3(c), which causes the flux density to pass between points X and X′. Accordingly, a portion of the voltage applied to gating winding 13 appears at point F in Fig. 1 for each positive half cycle of waveform of Fig. 3(d). This voltage appears as a pulse with a waveform shown in Fig. 3(f) and is applied to the motor 1 through reversing switch 9. The primary windings of motor 1 act as a parallel tuned circuit and, consequently, are effective to reduce the pulse waveform to a carrier voltage of a higher harmonic frequency, as illustrated by the waveform of Fig. 3(g), not including the pulse modulation shown therein.

In the disclosed embodiment, the carrier waveform of Fig. 3(g) will not in itself have a sufficient amplitude to overcome the starting and stalling torques of motor 1. However, according to the present invention, a pulse may be superimposed on the carrier waveform, as shown in Fig. 3(g), by pulsing control winding 16 of saturable reactor 4 at a selected repetition rate, pulse width and pulse amplitude.

In order to provide such a pulse, Fig. 1 shows a diode 21 connected to receive the alternating current voltage source 2 and oriented to pass the negative half cycle thereof to an R-C network consisting of resistor 22 and capacitor 23. Capacitor 23 is connected to ground and exponentially charged by the negative half cycle voltages being applied thereto. Connected to the junction between resistor 22 and capacitor 23 is one terminal of a conventional neon glow lamp 24, which has its other terminal connected to control winding 16. The other terminal of control winding 16 is connected to ground through variable resistor 25. Glow tube 24 may be selected such that when the capacitor is charged to a selected negative voltage, the glow tube conducts, thereby discharging capacitor 23 through control winding 16 and variable resistor 25 to ground. Since the pulse thus derived is negative and the control winding is wound in an opposite sense with respect to gating winding 13 and biasing winding 15, its pulse is properly phased to aid the gating winding and oppose the biasing winding in modifying the flux density. The negative voltage level at which the neon glow lamp fires is selected according to the desired amplitude of the control pulse. Resistor 22 and capacitor 23 are selected in accordance with the desired pulse repetition rate and the resistance of control winding 16 and variable resistor 25 is selected in accordance with the desired pulse width. By way of example, when the alternating current voltage source 2 is at 115 volts and 400 cycles per second it has been found workable to select a neon glow lamp which fires at about 70 volts, and the R-C network is selected such that the pulse repetition rate is approximately 20 c.p.s. Moreover, it is found workable that the discharge rate of the capacitor be such that the control pulse has a width commensurate with approximately 6 cycles of the 400 c.p.s. source 2.

Although no attempt has been made to show the modification of the waveform of Fig. 3(f) as a result of the pulses passing through the control winding, the waveform of Fig. 3(g) illustrates the resulting superimposed pulses on the carrier waveform. If such as showing were attempted in the waveform of Fig. 3(f), the control pulse passing through the control winding would tend to periodically increase the amplitude of several successive pulses of the waveform of Fig. 3(f) in a manner similar to that increase, which will result from a temporary decrease in the bias from the maximum bias level.

Referring to Fig. 2, the control pulse passing through control winding 16 will temporarily modify point Y′ in the positive direction, as indicated by the dotted line labeled Maximum Bias+Pulse, for several successive pulses of the waveform of Fig. 3(f), thereby temporarily decreasing the reactive impedance of saturable core 14. As a result, pulses are superimposed on the alternating current carrier shown in the waveform of Fig. 3(g). According to the present invention, the effective magnitude of the waveform of Fig. 3(g), which is being applied across the stator windings of motor 1, including the superimposed pulse, is designed to be just below the level that would be sufficient to exceed the starting and stalling torques of that motor.

However, if the bias of bias winding 15 were reduced by the insertion of resistance as a result of an adjustment of the wiper of variable resistor 19 from its ground terminal, this may no longer be true inasmuch as the superimposed pulses may very well exceed the starting and stalling torques of motor 1. Under these conditions, the series of pulses which exceed the minimum level may be effectively integrated by motor 1 to cause that motor to rotate at a slow creep speed. In addition to modifying the bias level by the adjustment of variable resistor 19, further speed variations might be obtained for motor 1 by varying the superimposed pulse repetition rate, the pulse width and/or the control pulse voltage level in control winding 16 by modification of the pulse circuit parameters.

For purposes of illustration, the waveforms of Figs. 4 and 5 have been included to illustrate the control of motor 1 which may be obtained by decreasing the bias of winding 15. For example, Fig. 4(g) shows pulses superimposed on the carrier waveform as a result of a medium bias on winding 15 where the pulses are of sufficient magnitude to cause the motor to rotate at a reasonably slow creep speed. Fig. 5(g) shows pulses superimposed on the carrier waveform as a result of minimum biasing when both the carrier and the pulses exceed the voltage level which corresponds to the starting and stalling torques of motor 1. Under the conditions corresponding to minimum biasing, motor 1 is energized for a comparatively high rotational speed where the existence of the superimposed pulses are no longer of substantial effect. Of course, as a practical matter, variable resistor 19 can be set anywhere between the conditions exemplified by Figs. 3, 4 and 5 in order to select the desired rotational speed or control the rotational speed by modifying the pulse repetition rate, pulse amplitude, or pulse width.

Referring again to the medium bias condition, the waveform of Fig. 4(d) represents the positive half cycle of the alternating current voltage source 2 which causes the flux density to be driven from point Y″ to X″. The voltage waveform of Fig. 4(e) represents the portion of the negative half cycle of source 2 which is available to drive the flux density of saturable core 14 from point X″ to point Y″ over a different path. As a result of the saturation condition existing between points X and X″, the reactive impedance of gating winding 13 goes to zero during the time corresponding to that portion of the positive half cycle waveform of Fig. 4(c), which causes the flux density to pass between points X and X″. Accordingly, a portion of the voltage applied to gating winding 13 appears at point F in Fig. 1 for each positive half cycle waveform of Fig. 4(d). This voltage appears as a pulse with a waveform such as that shown in Fig. 4(f). The pulse waveform of Fig. 4(f) is then applied to the motor 1 through a reversing switch 9. As will be noted, the pulse of Fig. 4(f) is considerably larger than the pulse of Fig. 3(f) because of the increase of the proportion of the cycle over which the saturable core 14 is saturated. Since motor 1 acts as a parallel tuned circuit, it is effective to reduce the pulse waveform of Fig. 4(b) to a carrier voltage of a higher harmonic frequency on which a pulse may be superimposed by the action of a control pulse passing through control winding 16, as shown by the waveform of Fig. 4(g). Referring to Fig. 2, the control pulse will temporarily modify the point Y″ in the positive direction, as indicated by the dotted line labeled Medium Bias + Pulse, for several successive pulses of the waveform of Fig. 4(f), thereby temporarily decreasing the reactive impedance of saturable core 14. As a result, pulses are superimposed on the alternating current carrier shown in the waveform of Fig. 4(g). Although the carrier waveform of Fig. 4(g) will not in itself have sufficient amplitude to overcome the starting and stalling torques of motor 1, the effective amplitude of the superimposed pulse on the carrier waveform has a magnitude which is sufficient. Accordingly, motor 1 will be energized for rotation in a direction determined by the condition of reversing switch 9. Furthermore, the speed of rotation of motor 1 may be controlled by adjusting resistor 19 to alter the magnitude of the alternating current carrier shown in the waveform of Fig. 4(g).

Resistor 19 may be adjusted for less and less biasing until a condition is reached where both the superimposed pulse and the alternating current carrier exceed the starting and stalling torque of the A.C. motor. Such a condition is described hereinabove as a minimum bias and is shown in Fig. 5. Therein, the waveform of Fig. 5(b) represents the positive half cycle of the alternating current voltage source 2 which causes the flux density to be driven from point Y‴ to X‴. The voltage waveform of Fig. 5(e) represents the portion of the negative half cycle of source 2 which is available to drive the flux density of saturable core 14 from point X‴ to point Y‴ over a different path. As a result of the saturation condition existing between points X and X‴, the reactive impedance of gating winding 13 goes to zero during the time corresponding to that portion of the positive half cycle waveform of Fig. 5(c) which causes the flux density to pass between points X and X‴. Accordingly, a portion of the voltage applied to gating winding 13 appears at point F in Fig. 1 for each positive half cycle waveform of Fig. 5(d). This voltage appears as a pulse with a waveform such as that shown in Fig. 5(f). The pulse waveform of Fig. 5(f) is then applied to motor 1 through a reversing switch 9. As will be noted, the pulse of Fig. 5(f) is considerably larger than the pulse of Fig. 4(f) because of the increase of the proportion of the cycle over which the saturable core 14 is saturated. Motor 1 acting as a parallel tuned circuit is effective to reduce the pulse waveform of Fig. 5(f) to a carrier voltage of a higher harmonic frequency on which a pulse may be superimposed by the action of a control pulse passing through control winding 16, as shown by the waveform of Fig. 5(g).

Referring to Fig. 2, the control pulse will temporarily modify point Y‴ in the positive direction, as indicated by the dotted line labeled Minimum Biasing + Pulse, for several successive pulses of the waveform of Fig. 5(f), thereby temporarily decreasing the reactive impedance of saturable core 14. As a result, pulses are superimposed on the alternating current carrier, as shown in the waveform of Fig. 5(g). If both the alternating current carrier and the superimposed pulse of Fig. 5(g) are of greater magnitude that that required to overcome the starting and stalling torques of motor 1, the superimposed pulse is no longer effective to energize motor 1 for slow or creeping speeds of operation. Since motor 1 is of the inductive type, it is the effective level of the alternating current carrier and the superimposed pulse, which determines the speed of its rotation with that speed approaching a synchronous speed (corresponding to the frequency of the carrier) in accordance with the load thereon. It should be emphasized, however, that once both the alternating current carrier and the superimposed pulse, such as the waveform of Fig. 5(g), are greater than the starting and stalling torques of the motor, an effective high degree of preciseness of speed control is no longer possible. It is only when the superimposed pulses are utilized for the energization of motor 1 that control adjustments may be made to alter its speed with a substantial degree of preciseness. As already indicated, changes in the speed of the motor may be attained by either changing the degree of biasing by an adjustment of variable resistor 19, or by changing the pulse repetition rate, pulse amplitude or pulse width of the control pulse being applied to control winding 16. The amplitude of the control pulse may be modified by adjusting the voltage at which neon tube 24 will fire. The pulse repetition rate may be altered by varying either resistor 22 or capacitor 23. The pulse width may be modified by modifying variable resistor 24 in the path of control winding 16. Moreover, when it is desired that motor 1 operate at its highest rotational speed, mechanically ganged switch 10 may be switched from the position shown in Fig. 1 to close contacts 10a and 11a, such that motor 1 will be energized directly from alternating current source 2 rather than to saturable core reactor 4.

While the teachings of the present invention have been described in detail hereinabove as particularly applicable for obtaining desirable speed control over a wide range of operating speeds including slow or creeping speeds for-alternating current motors, these teachings are also applicable to direct current motors, which may be effectively energized by pulses in addition to steady state voltage levels. In order to precisely determine the frequency of the carrier applied to the motor, a capacitor may be connected between point F and ground.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An electrical motor speed control comprising an electrical motor, an alternating current source, a source of control pulses having a width equal to a substantial number of cycles of said alternating current source, a saturable core reactor having a variable biasing means acting as a variable impedance between said sources and said motor, said saturable reactor also being responsive to said alternating current source and said source of control pulses for providing an alternating current carrier on which are superimposed pulses having an amplitude which is a function of the magnitude of said control pulses and the magnitude of said biasing, said superimposed pulses having sufficient amplitude to energize said electrical motor for slow speed operation.

2. An alternating current motor speed control comprising a two phase alternating current motor, an alternating current source, a source of control pulses having a width equal to a substantial number of cycles of said alternating current source, a saturable core reactor providing a variable reactance between said sources and said motor comprising a saturable core, a gate winding, a bias winding and a control winding, said gate winding being wound on said saturable core in a first sense and connected to receive positive half cycles from said alternating current source through a diode and provide an input voltage to said two phase motor, said bias winding also being wound on said saturable core in said first sense and connected to pass negative half cycles from said alternating current source through a diode and variable resistance to ground, said control winding being wound on said saturable core with an opposite sense and connected to receive said control pulses and oppose the action of said bias winding, said gate winding having a variable reactance to said alternating current source such that the voltage being applied to said two phase alternating current motor comprises an alternating current carrier having a magnitude commensurate with the biasing level in said bias winding on which are superimposed pulses commensurate with the amplitude, width and repetition rate of said control pulses and said biasing level, said superimposed pulses having sufficient amplitude and width to be effective in energizing said two phase alternating current motor for slow speed operation.

3. An alternating current motor speed control comprising a two phase alternating current motor, an alternating current source, a source of positive control pulses having a width equal to a substantial number of cycles of said alternating current source, means for varying the repetition rate of said positive pulse source, a saturable core reactor providing a variable impedance between said sources and said motor comprising a saturable core, a gate winding, a bias winding and a control winding, said gate winding being wound on said saturable core in a first sense and connected to receive positive half cycles of said alternating current source through a diode and provide an input voltage to said two phase motor, said bias winding also being wound on said saturable core in said first sense and connected to pass negative half cycles from said alternating current source through a diode and variable resistance to ground, said control winding being wound on said saturable core with an opposite sense and connected to receive said control pulses and oppose the action of said bias winding, said gate winding having a variable reactance to said alternating current source such that the voltage being applied to said two phase alternating current motor comprises an alternating current carrier having a magnitude commensurate with the biasing level in said bias winding on which are superimposed pulses commensurate with the magnitude of said control pulses and said biasing level, said superimposed pulses having sufficient amplitude and width to be effective to energize said two phase alternating current motor to rotate at a slow speed.

4. An alternating current motor speed control comprising a two phase alternating current motor, an alternating current source, a source of positive control pulses having a width equal to a substantial number of cycles of said alternating current source, means for varying the width of said positive pulse, a saturable core reactor providing a variable impedance between said sources and said motor comprising a saturable core, a gate winding, a bias winding and a control winding, said gate winding being wound on said saturable core in a first sense and connected to receive positive half cycles of said alternating current source through a diode and provide an input voltage to said two phase motor, said bias winding also being wound on said saturable core in said first sense and connected to pass negative half cycles from said alternating current source through a diode and variable resistance to ground, said control winding being wound on said saturable core with an opposite sense and connected to receive said control pulses and oppose the action of said bias winding, said gate winding having a variable reactance to said alternating current source such that the voltage being applied to said two phase alternating current motor comprises an alternating current carrier having a magnitude commensurate with the biasing level in said bias winding on which are superimposed pulses commensurate with the magnitude of said control pulses and said biasing level, said superimposed pulses being effective to energize said two phase alternating current motor for operation in its slow speed mode.

5. An alternating current motor speed control comprising a two phase alternating current motor, an alternating current source, a source of positive control pulses having a width equal to a substantial number of cycles of said alternating source, means for varying the amplitude of said alternating current positive pulse, a saturable core reactor providing a variable impedance between said sources and said motor comprising a saturable core, a gate winding, a bias winding and a control winding, said gate winding being wound on said saturable core in a first sense and connected to receive positive half cycles of said alternating current source through a diode and provide an input voltage to said two phase motor, said bias winding also being wound on said saturable core in said first sense and connected to pass negative half cycles from said alternating current source through a diode and variable resistance to ground, said control winding being wound on said saturable core with an opposite sense and connected to receive said control pulses and oppose the action of said bias winding, said gate winding having a variable reactance in said gate winding to said alternating current source such that the voltage being applied to said two phase alternating current motor comprises an alternating current carrier having a magnitude commensurate with the biasing level in said bias winding on which are superimposed pulses commensurate with the magnitude of said control pulses and said biasing level, said superimposed pulses being of sufficient magnitude to energize said two phase alternating current motor for slow speed operation.

6. An alternating current motor speed control comprising a two phase alternating current motor, an alternating current source, a source of control pulses having a width equal to a substantial number of cycles of said alternating current source, a saturable core reactor acting as a variable impedance between said sources and said motor, said saturable reactor being responsive to said alternating current source and said source of control pulses for providing an alternating current carrier on which are superimposed pulses having a magnitude commensurate with the magnitude of said control pulses, said superimposed pulses having sufficient magnitude to energize said two phase alternating current motor for slow speed operation.

7. An alternating current motor speed control comprising a two phase alternating current motor, an alternating current source, a source of control pulses having a width equal to more than one cycle of said alternating current source, a saturable core reactor having a variable biasing means acting as a variable impedance between said sources and said motor, said saturable reactor being responsive to said alternating current source and said source of control pulses for providing an alternating current carrier on which are superimposed pulses having an amplitude which is a function of the magnitude of said control pulses and the magnitude of said biasing, said pulses having sufficient magnitude to energize said two phase alternating current for slow speed operation.

8. An alternating current motor speed control comprising an alternating current motor, an alternating current source, a source of control pulses having a width equal to a substantial number of cycles of said alternating source, means for varying the amplitude of said positive pulse, a saturable core reactor having a variable biasing means acting as a variable impedance between said sources and said motor, said saturable reactor being responsive to said alternating current source and said source of control pulses for providing an alternating current carrier on which are superimposed pulses having an amplitude which is a function of the magnitude of said control pulses and the magnitude of said biasing, said superimposed pulses having sufficient magnitude to energize said alternating current motor for slow speed operation in accordance with the bias of said core reactor and the magnitude of said control pulse.

9. An alternating current motor speed control comprising an alternating current motor, an alternating current source, a source of control pulses having a width equal to a substantial number of cycles of said alternating current source, the saturable core reactor having a biasing means acting as a variable impedance between said sources and said motor, said saturable reactor being responsive to said alternating current source and said source of control pulses for providing an alternating current carrier on which are superimposed pulses having a magnitude that is dependent on said biasing means and the magnitude of said control pulses, said superimposed pulses having sufficient magnitude to energize said alternating current motor for slow speed operation at a speed commensurate with the average value of said superimposed pulses as long as said alternating current carrier does not exceed a voltage level commensurate with the starting and stalling torque of said alternating current motor.

10. An electric motor speed control comprising an electric motor, an alternating current source, a source of control pulses having a width equal to a substantial number of cycles of said alternating current source, the saturable core reactor having a biasing means acting as a variable impedance between said sources and said motor, said saturable reactor being responsive to said alternating current source and said source of control pulses for providing an alternating current carrier on which are superimposed pulses having a magnitude that is dependent on said biasing means and the magnitude of said control pulses, said superimposed pulses having sufficient magnitude to energize said electric motor for slow speed operation at a speed commensurate with the average value of said superimposed pulses as long as said alternating current carrier does not exceed a voltage level commensurate with the starting and stalling torque of said electric motor.

11. An alternating current source having a variable magnitude comprising an alternating current source, a source of control pulses having a width equal to a substantial number of cycles of said alternating source, a saturable core reactor acting as a variable impedance connected to said sources and having a variable biasing means, said saturable core reactor having an output terminal, said saturable core reactor being responsive to said alternating current course and said source of control pulses for providing an alternating current carrier at said output terminal on which are superimposed pulses having an amplitude which is a function of the magnitude of said control pulses and the magnitude of said biasing.

No references cited.